United States Patent [19]

De Mon et al.

[11] Patent Number: 4,879,049

[45] Date of Patent: Nov. 7, 1989

[54] METHOD OF REMOVAL OF POLYCYCLIC AROMATIC HYDROCARBONS FROM A LIQUID

[75] Inventors: Bob De Mon, Alkmaar; Antonius I. Van Hoorn, Koedijk, both of Netherlands

[73] Assignee: Hoogovens Groep B.V., IJmuiden, Netherlands

[21] Appl. No.: 126,356

[22] Filed: Nov. 30, 1987

[30] Foreign Application Priority Data

Dec. 8, 1986 [NL] Netherlands .......................... 8603107

[51] Int. Cl.$^4$ ............................................. B01D 37/02
[52] U.S. Cl. ..................................... 210/777; 210/909
[58] Field of Search ............... 210/739, 744, 777, 778, 210/909

[56] References Cited

FOREIGN PATENT DOCUMENTS 1163034 9/1969 United Kingdom ................ 210/725

*Primary Examiner*—Peter Hruskoci
*Attorney, Agent, or Firm*—Stevens, Davis, Miller & Mosher

[57] ABSTRACT

A method of removal of polycyclic aromatic hydrocarbons (PAH) by precoat vacuum filtration is characterized in that organic particles are present in the precoat which, when subjected to a specific precoat layer build-up test, have a layer thickness in the range 30–200 mm. The immersion depth of the drum during the filtering is more than 40% of the drum diameter. Improved filtering results. A method of testing a finely divided organic material in order to determine its suitability for precoat vacuum filtration is also disclosed.

6 Claims, 1 Drawing Sheet

METHOD OF REMOVAL OF POLYCYCLIC AROMATIC HYDROCARBONS FROM A LIQUID

BACKGROUND OF THE INVENTION

1. Field of the Invention

The invention relates to a method of removal of polycyclic aromatic hydrocarbons (PAH) from a liquid, for example waste water from a coking process, by precoat vacuum filtration using precoat material comprising a finely divided organic material. The invention also relates to a method of testing a finely divided organic material for its suitability for use as a precoat material in precoat vacuum filtration, e.g. for removal of PAH.

Precoat vacuum filtration is a known filtering process which in essence comprises the steps of (i) applying to the exterior of the filtering surface of a vacuum filter drum of a rotary vacuum filter a particulate precoat comprising finely divided organic particles, (ii) filtering said liquid through said filter drum with said precoat thereon, by partially immersing the rotating drum in the liquid and applying reduced pressure at the inside of the drum, (iii) continuously or intermittently removing the surface layer of the precoat at the exterior of the precoat thereby to present, to subsequently filtered liquid, fresh particles of the precoat at the exterior of the precoat.

Normally the drum is rotated with its axis horizontal. Conventional rotary vacuum filter apparatus may be used, the details of which are known to the expert in this field and need not be repeated here.

Precoat vacuum filtration has the effect of removing solid particles carrying PAH from the liquid and also of removing a second liquid phase containing PAH which may be present.

Precoat vacuum filtration is fully described and explained in "Filtration for removal of polycyclic aromatic hydrocarbons from coke oven waste water" by A. van Hoorn published in "Fachberichte Hüttenpraxis Metallweiterverarbeitung", Vol. 22, No. 10, 1984 pages 1088-1092 the contents of which are herein incorporated by reference. This article, written by one of the present inventors, states that it is possible to remove PAH out of waste water from a coking plant by means of precoat vacuum filtration using wood flour as precoat material. As far as is known, this is the only method for removing PAH with an acceptable yield. It has now been found that the choice of the precoat material is critical to this method.

A problem with the known method is that filter performance and filtration properties can vary considerably from batch to batch of wood flour. Attempts to relate these differences to the wood flour grain size distribution and with the results of other known methods of analysis resulted in failure.

SUMMARY OF THE INVENTION

The object of the invention is to provide a method for the removal of PAH from a liquid by precoat vacuum filtration, in which a finely distributed organic material which gives good filter performance is used in the precoat material.

Another object of the invention is to provide a method of testing finely divided organic material to be used as precoat material in precoat vacuum filtration, e.g. in the removal of PAH from a liquid, so as to ascertain which materials give good filter performance and have reproducible filtration properties.

In accordance with the invention in one aspect the method of removal of PAH by precoat vacuum filtration is characterized in that the organic particles of the precoat consist of particulate material which, when subjected to a precoat layer build-up test as herein defined, have a layer thickness in the range 30-200 mm, and in that the immersion depth of the drum during the filtering is more than 40% of the drum diameter.

In this patent application organic material is understood to be material of plant-type or animal origin.

Experiments have shown that for a good filtering result and good filtration properties of the organic material, the layer thickness indicated by the precoat layer build-up test described below must be in the range 30-200 mm. Apparently, this range defines finely distributed organic materials, of which the particles in their size, shape, staple length and surface features are highly suitable to the removal of PAH, so that if the organic material is selected within this range a good filtering result is obtained.

The method of testing a finely divided organic material in order to determine its suitability for use as precoat material in precoat vacuum filtration in accordance with the invention, comprises the steps of (i) preparing a uniform slurry of the organic material, (ii) passing the slurry upwardly through a filter for a predetermined time using a predetermined substantially constant reduced pressure on the downstream side of the filter, (iii) measuring the thickness of the layer of the organic material thus formed against the filter, thereby to obtain a value for the layer thickness specific for said organic material under test, which value is a measure of the suitability of the organic material in precoat vacuum filtration.

The specific precoat layer build-up test, referred to in this specification as "the precoat layer build-up test" herein defined, will now be described with reference to the accompanying drawing.

BRIEF INTRODUCTION OF THE DRAWINGS

Figures 1, 2:
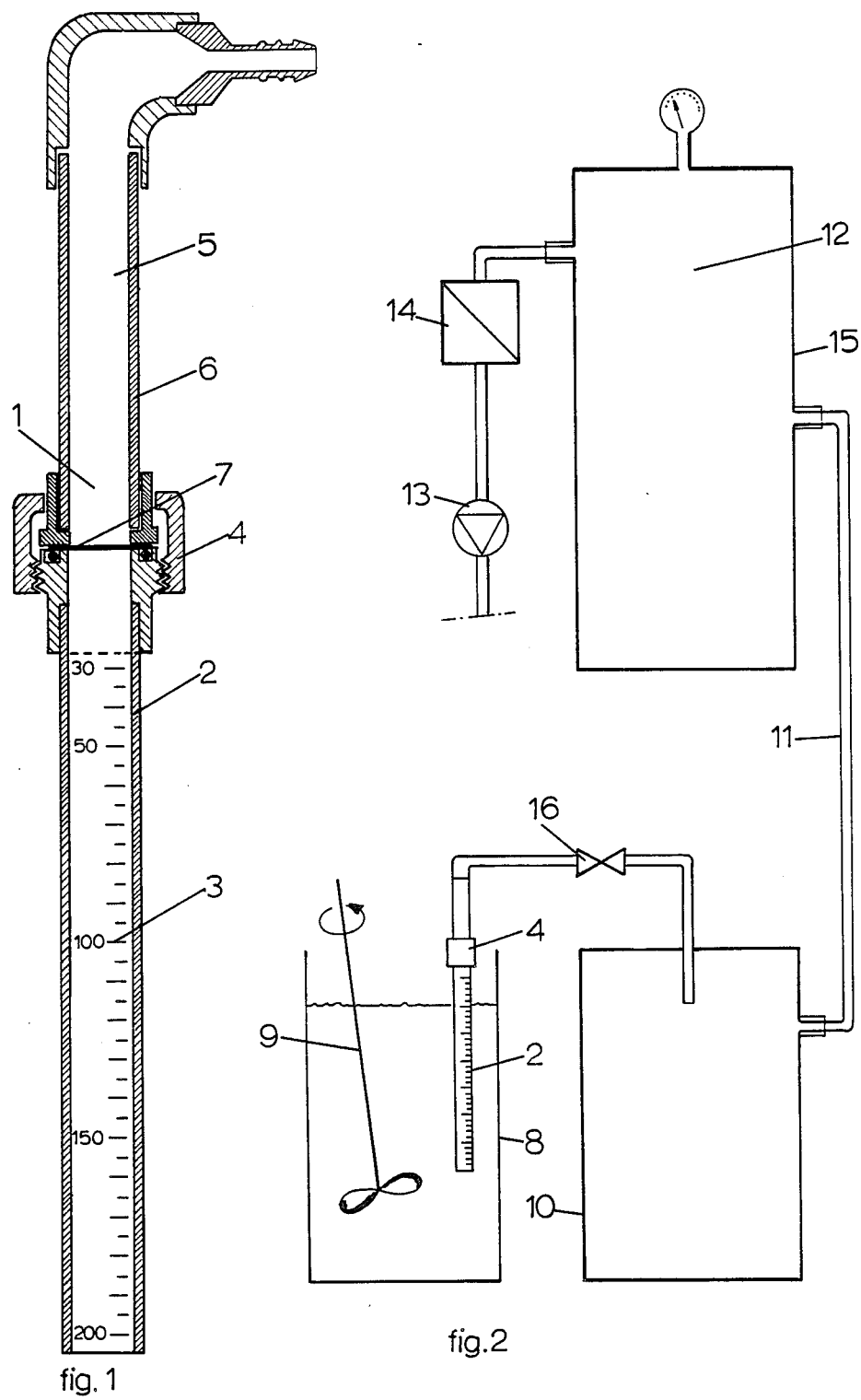
FIG. 1 shows a test tube and filter for the specific precoat layer build-up test.
FIG. 2 shows a test set-up for the precoat layer build-up test.

The test tube 1 shown in FIG. 1 consists of a constant cross-seciton transparent tube 2 of Plexiglas (Trade Mark) or equivalent with an internal diameter of 14.0 mm and provided with a linear scale 3 graduated in mm. By means of connector 4 the tube is joined to take-off pipe 5 which includes a length of transparent tube 6. A small piece of conventional type filter cloth 7 (Lainyl-35-3 CA or equivalent) is fitted at the top of the transparent tube 2 in the connector 4 of the test-tube, this cloth also being useful in precoat vacuum filtration.

FIG. 2 shows that, to carry out a test, the test tube and filter of FIG. 1 is arranged with the tube 2 dipping into a storage tank 8, which is provided with a stirrer 9. The take-off pipe 5 is connected to a filtrate collection tank 10. By means of a vacuum line 11, tank 10 is connected to a vacuum installation 12 consiting of a vacuum pump 13, a vacuum pressure regulator 14 and a vacuum buffer tank 15 with a content of 15 liters.

The procedure of the specific precoat layer build-up test is as follows:

In the storage tank 8 four liters of slurry of the organic material under test are prepared with water to a concentration of 10 grams of organic material per liter. The organic material is allowed to soak for at least 2.5 hours. The partial vacuum in the vacuum buffer tank 15 is held at 0.35 bar. When the slurry is prepared the test tube 1 is immersed into the storage tank 8 while the slurry is being stirred with the stirrer 9, and connected for 60 seconds to the vacuum buffer tank 15 by opening the tap 16. Then the thickness of the layer of the organic material built up against the filter 7 in the tube 2 is read off. This layer thickness is characteristic of the organic material and determines its suitability for use in precoat vacuum filtration.

Turning now to the PAH removal method of the invention, as mentioned previously, to achieve a good filter output in precoat vacuum filtration to remove PAH, the layer thickness of the organic material indicated by the precoat layer build-up test described above should be in the range 30–200 mm. If an organic material with a layer thickness of over 200 mm is used as a precoat material, the throughput is too great so that the filter result is poor. With a layer thickness below 30 mm, the throughput is poor and the filter becomes blocked.

Within the above-mentioned range of layer thicknesses as specified by the precoat build-up test, and for any liquid out of which PAH have to be removed, an optimum range of layer thicknesses may be determined for obtaining good filter performance and filtration qualities depending on the form in which PAH are present in the liquid. In the case of PAH in waste water from a coking plant described in the above-mentioned article of van Hoorn, where PAH is mainly present in the waste water cohering with solid particles in the waste water, a filter output of over 90% has been achieved with organic materials giving layer thicknesses in the range 110–160 mm in the precoat build-up test. However, in another case in which PAH arises as a result of the coking of mineral oils and the PAH are present in the waste water mainly in the form of an emulsion, a range of considerably smaller layer thicknesses is needed to achieve an acceptable filter output. It is assumed that in this case not only filtration of PAH but also adsorption of PAH onto the precoat material contributed towards the removal of PAH out of the waste water.

If the finely divided organic material consists at least in part of wood flour, then the preferred wood flour originates from the rough pine (Pinus Sylvestris) and/or beech (Fagus Sylvatica). In practice it appeared that these types of wood flour are particularly suited to the removal of PAH from a liquid.

Also preferred is a precoat material of a mixture of components including the organic material in a quantity of 25–100% of the mixture and including also finely divided mineral material such as perlite or diatomite. With this mixture as a precoat layer, the precoat material behaves less like a sponge. A precoat layer consisting entirely of organic material can start to give a lower pass rate if there is a temporarily high concentration of PAH in the liquid, become drawn together onto the vacuum filter drum through the effect of the vacuum, and then go outside the area of the mesh which then disturbs the filtration process.

In the method of PAH removal of the invention, a precoat vacuum filter of the rotary type incorporating a vacuum filter drum is used, and the immersion depth of the vacuum filter drum is more than 40% of the diameter of the drum and preferably at about 60%. Immersion depth here is understood to be that part of the height of the drum revolving around its horizontal axis which is immersed in the liquid. Usually 40% is the immersion depth for the rotary precoat vacuum filter. When precoat materials with organic material have layer thicknesses within the prescribed range in accordance with the precoat layer build-up test herein defined, precoat layers with relatively higher pass rates are obtained. this means that the precoat layer dries relatively quickly after leaving the liquid and the vacuum causes a high air leakage, so that large vacuum pumps are necessary. By using a greater immersion depth air leakage is restricted, smaller vacuum pumps can be used and vacuum filter drums can be smaller. The vacuum line connection to the drum interior is suitably adapted to allow immersion of e.g. 60%.

In order to lessen further the abovementioned drawback of the quick drying precoat layer, the precoat material on that part of the precoat vacuum filter drum projecting above the liquid level is preferably moistened locally with additional liquid. It is remarked that such moistening is not known in rotary precoat vacuum filtration, but it is known in rotary vacuum filtration for rinsing off the filter cloth above the liquid level.

What is claimed is:

1. Method of removal of polycyclic aromatic hydrocarbons (PAH) from a liquid by subjecting the liquid to precoat vacuum filtration in order to remove from the liquid at least one of solid particles which carry PAH and a second liquid phase which contains PAH, said precoat vacuum filtration comprising the steps of
   (i) providing a rotary vacuum filter having a rotatable vacuum filter drum having a rotation axis and a diameter and with respect to said axis a peripheral filtering surface which defines the interior of the drum,
   (ii) applying to the exterior side of said peripheral filter of the drum a particulate precoat comprising finely divided organic particles in the form of particulate material which in a method of testing applied before the material is applied to the drum in order to determine its suitability for use as precoat material in precoat vacuum filtration, said precoat material had a layer thickness in the range of 30–200 mm, said method of testing comprises the steps of
      (a) preparing a uniform slurry of the organic particles;
      (b) passing the slurry upwardly through a filter for a predetermined time using a predetermined substantially constant reduced pressure on the downstream side of the filter;
      (c) measuring the thickness of the layer of the organic material thus formed against the filter;
   (iii) filtering said liquid through said filter drum with said precoat thereon to the interior of the drum, by partially immersing the drum rotating about said axis, in liquid and applying reduced pressure at the interior of the drum, the immersion depth of the drum during the filtering being more than 40% of the drum diameter,
   (iv) continuously or intermittently removing a surface layer of the precoat at the exterior of the precoat thereby to present, to subsequently filtered liquid, fresh particles of the precoat at the exterior of the precoat, said organic material consists of wood flour, originating from at least one of the rough pine (Pinus Sylvestris) and the beech (Fagus Sylvatica).

2. Method in accordance with claim 1 wherein said precoat is entirely organic material or a mixture of organic material and finely divided mineral material, said mixture containing at least 25% organic material.

3. Method in accordance with claim 1 in which the liquid filtered is waste water from a coking plant.

4. Method in accordance with claim 1 wherein the said immersion depth of the vacuum filter drum is about 60% of its diameter.

5. Method in accordance with claim 1 wherein during filtering the precoat material on that part of the drum projecting above the liquid level is moistened with additional liquid.

6. Method of removal of polycyclic aromatic hydrocarbons (PAH) from waste water from a coking plant by subjecting the waste water to precoat vacuum filtration in order to remove from the waste water at least one of solid particles which carry PAH and a second liquid phase which contains PAH, said precoat vacuum filtration comprising the steps of (i) providing a rotary vacuum filter having a rotatable vacuum filter drum having a rotation axis and a diameter and with respect to said axis a peripheral filtering surface which defines the interior of the drum, (ii) applying to the exterior side of said peripheral filter of the drum a particulate precoat comprising finely divided organic particles in the form of particulate material which in a method of testing applied before the material is applied to the drum in order to determine its suitability for use as a precoat material in precoat vacuum filtration, said precoat material had a layer thickness in the range 110–160 1 mm, said method of testing comprises the steps of (a) preparing a uniform slurry of the organic particles;

(b) passing the slurry upwardly through a filter for a predetermined time using a predetermined substantially constant reduced pressure on the downstream side of the filter;

(c) measuring the thickness of the layer of the organic material thus formed against the filter;

(iii) filtering said liquid through said filter drum with said precoat thereon to the interior of said drum, by partially immersing the drum rotating about said axis, in liquid and applying reduced pressure at the interior of the drum, the immersion depth of the drum during the filtering being more than 40% of the drum diameter, and (iv) continuously or intermittently removing a surface layer of the precoat at the exterior of the precoat thereby to present, to subsequently filtered liquid, fresh particles of the precoat at the exterior of the precoat, said organic material consists of wood flour, originating from at least one of the rough pine (Pinus Sylvestris) and the beech (Fagus Sylvatica).

* * * * *